United States Patent Office.

JAMES MARSHALL CALDWELL AND GEORGE WORTHINGTON CALDWELL, OF BURLINGTON, NEW JERSEY.

Letters Patent No. 102,915, dated May 10, 1870.

IMPROVEMENT IN INDELIBLE WRITING-FLUIDS OR INKS.

The Schedule referred to in these Letters Patent and making part of the same.

*To all whom it may concern:*

Be it known that I, JAMES MARSHALL CALDWELL, and I, GEORGE WORTHINGTON CALDWELL, both of the city of Burlington, State of New Jersey, have invented a new and improved Indelible Writing-Fluid.

The nature of the invention consists of a compound of the following ingredients, in the proportions specified.

To prepare our writing-fluid we take sulphate iron, forty-eight ounces; Aleppo galls, seventy-two ounces; extract logwood, twenty-eight ounces; gum Arabic, thirty-six ounces; purified lamp-black, one hundred and twenty-eight ounces; aniline, (blue,) eighty ounces; alcohol, one gallon; oil cloves and nitric acid, each a sufficient quantity; boiling water, a sufficient quantity to make twenty gallons.

In the manufacture of our writing-fluid, we use the following process:

Dissolve the sulphate of iron, extract logwood, and gum Arabic in about ten gallons of boiling water. Then add the bruised Aleppo galls, and allow the mixture to digest, with occasional agitation, in a warm atmosphere for the space of nine days.

Triturate the purified lamp-black in about two gallons of the boiling water and half a gallon of the alcohol, until thoroughly mixed. Then add to this mixture the aniline blue, previously dissolved in half a gallon of alcohol, and two gallons of boiling water. Transfer this mixture to that first made.

Lastly, add the diluted nitric acid and oil cloves, with sufficient boiling water to make the whole measure twenty gallons, and allow the mixture to macerate for five days longer, when it is ready for filtration and use.

We claim for our writing-fluid, made according to the formula and process as herein described, the following properties:

Fluidity; freedom from mold; depth of color; permanency in all conditions of air and light; indelibility —resisting in a remarkable degree the action of the most concentrated mineral acids and alkaline solutions; and that it cannot be entirely obliterated from paper without injuring the fiber and texture of the paper itself, and rendering it unfit for further use.

We do not confine ourselves to the exact proportion of ingredients which is specified, in making our ink, as it is obvious that it can be varied without departing from the principle of the invention. We can also vary the tint of the ink by a change in the proportion and shade of the aniline color employed.

What we claim as our invention, and desire to secure by Letters Patent, is—

The combination of carbon, a metallic salt, and a vegetable coloring-extract, such as herein described, or their equivalents, with an aniline color, so as to form a writing-ink, as set forth.

In testimony whereof we have hereunto subscribed our names.

JAMES MARSHALL CALDWELL.
GEORGE W. CALDWELL.

Witnesses:
HENRY F. REINSHEIN,
J. P. DELANEY.